United States Patent [19]
Shinohara

[11] Patent Number: 6,049,357
[45] Date of Patent: *Apr. 11, 2000

[54] IMAGE PICKUP APPARATUS INCLUDING SIGNAL ACCUMULATING CELLS

[75] Inventor: Mahito Shinohara, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/841,333

[22] Filed: Apr. 30, 1997

Related U.S. Application Data

[63] Continuation of application No. 08/442,122, May 16, 1995, abandoned, which is a continuation of application No. 08/083,932, Jun. 28, 1993, abandoned.

[30] Foreign Application Priority Data

Jun. 30, 1992 [JP] Japan .................................. 4-196145

[51] Int. Cl.⁷ .................................................. H04N 3/14
[52] U.S. Cl. .......................... 348/307; 348/297; 348/301; 348/308; 348/312; 348/315; 250/208.1
[58] Field of Search .................................... 348/294–300, 348/301, 302, 303, 304, 305, 306, 307, 308, 309, 310, 311, 317, 319, 281, 282, 283; 250/208.1; H04N 3/14, 5/335

[56] References Cited

U.S. PATENT DOCUMENTS

| | | | |
|---|---|---|---|
| 3,824,337 | 7/1974 | Sangster et al. | 348/309 |
| 4,803,710 | 2/1989 | Elabd | 377/60 |
| 4,804,854 | 2/1989 | Adachi et al. | 250/578 |
| 4,959,723 | 9/1990 | Hashimoto | 358/213.11 |
| 5,043,821 | 8/1991 | Suga | 348/320 |
| 5,146,339 | 9/1992 | Shinohara et al. | 348/301 |
| 5,172,249 | 12/1992 | Hashimoto | 358/482 |
| 5,322,994 | 6/1994 | Uno | 250/208.1 |
| 5,355,165 | 10/1994 | Kosonocky | 348/311 |
| 5,386,108 | 1/1995 | Arikawa et al. | 250/208.1 |
| 5,436,662 | 7/1995 | Nagasaki et al. | 348/312 |
| 5,587,738 | 12/1996 | Shinohara | 348/302 |
| 5,693,932 | 12/1997 | Ueno et al. | 250/208.1 |
| 5,698,844 | 12/1997 | Shinohara et al. | 250/214 R |
| 5,861,620 | 1/1999 | Takahashi et al. | 250/208.1 |

FOREIGN PATENT DOCUMENTS

| | | | |
|---|---|---|---|
| 3-162183 | 7/1991 | Japan | H04N 5/335 |
| 4-177984 | 6/1992 | Japan | H04N 5/335 |

*Primary Examiner*—Wendy Garber
*Assistant Examiner*—Ngoc-Yen Vu
*Attorney, Agent, or Firm*—Fitzpatrick, Cella, Harper & Scinto

[57] ABSTRACT

A solid state image pickup apparatus is constructed by arranging a plurality of photoelectric converting pixels each for accumulating charges produced by receiving a light energy and for amplifying the charges. Timings to start and finish the accumulation of the charges for each pixel in a photoelectric converting section are set to be equal to or slightly deviated from the accumulation timing. For this purpose, the apparatus has: a signal accumulating section in which signal accumulating cells having transistors are arranged; transfer sections 26, 29, and 31 each for transferring the signals of the photoelectric converting pixels as voltages to the control electrodes of the signal accumulating cells; and a reading circuit for outputting the signal from one of the main electrodes of the transistors of the signal accumulating cells.

15 Claims, 11 Drawing Sheets

IMAGE PICKUP APPARATUS INCLUDING SIGNAL ACCUMULATING CELLS

This application is a continuation of application Ser. No. 08/442,122 filed May 16, 1995, abandoned which is a continuation of application Ser. No. 08/083,932 filed Jun. 28, 1993, now abandoned.

BACKGROUND OF THE INVENTION

1. Field of the Invention

The present invention relates to a solid state image pickup apparatus and, more particularly, to a solid state image pickup apparatus using a photoelectric converting device of the amplifying type for amplifying photoelectrically converted signal charges and generating.

2. Related Background Art

In recent years, in a solid state image pickup apparatus or the like, examination has been made with respect to a photoelectric converting device of the amplifying type for amplifying photoelectrically converted signal charges and generating. As one of such photoelectric converting devices of the amplifying type, there is a solid state image pickup apparatus using a photoelectric converting device (for example, bipolar transistor, MOS transistor, JFET (Junction Field Effect Transistor), SIT (Static Induction Transistor), etc.) which is constructed in a manner such that a unit pixel has a construction similar to that of a transistor and the charges produced by the light irradiation are accumulated in a control electrode region, and an amplified signal is generated from a main electrode region.

FIG. 1 is a circuit constructional diagram of a photoelectric converting section and a signal reading section of a solid state image pickup apparatus using a bipolar type sensor comprising, for example, the bipolar transistor among the above photoelectric converting devices.

In FIG. 1, reference numeral 1 denotes a bipolar type sensor (equivalently, bipolar transistor); 2 a capacitor to control a base potential of the bipolar type sensor 1; and 3 a PMOS transistor to reset the base potential of the bipolar type sensor 1. One unit pixel is constructed by the bipolar type sensor 1, capacitor 2, PMOS transistor 3. Reference numeral 4 denotes a vertical output line; 5 a horizontal drive line; 6 an MOS transistor to reset the vertical output line 4; 7 a capacitor to accumulate an output signal from the pixel; 8 an MOS transistor to transfer an output from the pixel to the capacitor 7; 9 a horizontal output line; 10 an MOS transistor to transfer an output of the capacitor 7 to the horizontal output line 9; 11 an MOS transistor for buffering which is selected by a vertical shift register and is used to apply a drive pulse to the pixel; 12 a preamplifier to generate a sensor output; 13 an input terminal to apply a pulse to a gate of the MOS transistor 6; 14 an input terminal to apply a pulse to a gate of the MOS transistor 8; 15 an input terminal to apply a drive pulse to the MOS transistor 11; and 16 an output terminal.

FIG. 2 is a timing chart for explaining the operations of a photoconductive converting section and a signal reading section.

As shown in FIG. 2, for example, while a pulse $\phi_{VC}$ which is supplied to the input terminal 13 is maintained at the high level at time $t_1$, a pulse $\phi_T$ which is supplied to the input terminal 14 is set to the high level and the MOS transistor 8 is turned on. In this state, since the vertical output line 4 is connected to the ground GND through the MOS transistor 6, the capacitor 7 is also reset to the GND.

Subsequently, the pulse $\phi_{VC}$ is set to the low level at time $t_2$, the MOS transistor 6 is turned off, and the vertical output line 4 and capacitor 7 are set into a floating state. In this state, when a pulse $\phi_R$ which is supplied to the input terminal 15 is set to the high level at $t_3$, a base potential of the bipolar type sensor 1 is raised through the capacitor 2. The signal of the potential corresponding to the base potential in a base region in which the light carriers have been accumulated is generated to an emitter.

After the pulses $\phi_T$, $\phi_R$, and $\phi_{VC}$ were respectively set to the low level, middle level, and high level at time $t_4$, when the pulse $\phi_R$ is set to the low level at time $t_5$, the PMOS transistor 3 is turned on and the base of the bipolar type sensor 1 is connected to the ground. After that, when the level of the pulse $\phi_R$ is changed to the high level through the middle level for a time interval from $t_6$ to $t_7$, a portion between the base and emitter of the sensor 1 is set into a forward biasing state and the base potential decreases by a base current.

When the level of the pulse $\phi_R$ is changed from the high level to the middle level at time $t_8$, the base potential drops by the capacitive coupling through the capacitor 2. The portion between the emitter and base is reversely biased and the accumulation of the light carrier is started.

As described above, a series of operations such as reading operation, resetting operation, and starting operation of the accumulation are sequentially executed every line.

According to such a solid state image pickup apparatus, the light carriers accumulated in the base of the bipolar type sensor constructing the pixels can be amplified and read out. Thus, there is an advantage such that the output signal is hardly influenced by noises of the reading circuit system.

It is also possible to construct in a manner such that the amplifying type photoelectric converting device such as a foregoing bipolar type sensor or the like is used and all of the pixels are reset in a lump. The invention can be also applied to a still video or the like.

FIG. 3 is a circuit constructional diagram of the photoelectric converting section and signal reading section of the solid state image pickup apparatus in case of using the foregoing bipolar type sensor. In FIG. 3, the same component elements as those shown in the solid state image pickup apparatus in FIG. 1 are designated by the same reference numerals and only the component elements with different constructions will be explained hereinbelow.

In FIG. 3, reference numeral 50 denotes an MOS transistor to reset the horizontal output line 9; 33 an emitter follower circuit to set a source potential of the PMOS transistor in order to execute the clamping operation of a pixel S (comprising the bipolar type sensor 1, capacitor 2, and PMOS transistor 3); 34 a PMOS transistor to set a base potential of the emitter follower circuit 33; and 35 a terminal to apply a pulse to a gate of the PMOS transistor 34.

The operation of the above solid state image pickup apparatus will now be described hereinbelow.

First, the pulse at the low level is applied to a terminal 35 and the PMOS transistor 34 is turned on, thereby setting an output of the emitter follower circuit 33 to a positive potential. The output of the emitter follower circuit 33 is connected to a source of the PMOS transistor 3 of the pixel S. When the source potential of the PMOS transistor 3 rises so as to be sufficiently higher than a gate potential of the PMOS transistor 3 as the PMOS transistor 3 is sufficiently set into the ON state as much as possible, holes are implanted into the base of the bipolar type sensor 1 of the pixel through the PMOS transistor 3. Subsequently, by applying the pulse at the high level to the terminal 35, the PMOS transistor 34 is turned off and an output of the emitter follower circuit 33 is set into the grounding potential GND. In this instance, by applying the pulse at the high level to the terminal 13, the MOS transistor 6 is turned on and the vertical output line 4 is set into the GND (the processes until now are called a first reset).

In this state, the vertical shift register is subsequently driven and a reset pulse of the pixel is applied to the terminal 15, thereby sequentially resetting to pixels every line. The bases of the bipolar type sensors 1 of all of the pixels are set into a predetermined potential and are reversely biased (the processes until now are called a second reset).

After the accumulating operation of the light carriers was executed, the pulse at the low level is applied to the terminal 13, thereby turning off the MOS transistor 6. A read pulse is applied from the terminal 15 every line selected by the output of the vertical shift register. The signal output is accumulated into the capacitor 7 through the MOS transistor 8. The signal output accumulated in the capacitor 7 is transferred to the horizontal output line 9 through the transferring MOS transistor 10 selected by the horizontal shift register and is outputted from the output terminal 16 via the preamplifier 12.

The first subject according to the present invention will now be described hereinbelow.

In the solid state image pickup apparatus using the amplifying type photoelectric converting device as mentioned above, the operations such as reading operation, resetting operation, and charge accumulating operation are sequentially executed every horizontal line by the vertical shift register. Therefore, when it takes a time to perform the resetting operation and reading operation, a scanning time by the vertical shift register becomes slow. Consequently, there is a large deviation between the start and end times of the accumulation of the charges of one horizontal line and the start and end times of the accumulation of the charges of the next horizontal line. In the reading operation, it takes a predetermined time for the operations to transfer the signal to the capacitor 7 and to read out the accumulated charges therefrom through the preamplifier 12. Therefore, a predetermined time is also required for the scanning operation by the vertical shift register.

Accordingly, in the case where the light such as to be lit on for only about one field period of time is detected and the field image information at that time is obtained, the overlap period of time between the accumulating period of each line and the lighting period of the time differs every line. There is, consequently, a problem such that even if the incident intensity of the turn-on light into the sensor is equal for all of the lines, an amount of signal charges of the turn-on light differs every line.

The second subject according to the invention will now be described.

Since the above conventional solid state image pickup apparatus performs the reverse bias accumulating operation, there is a problem such that a function such that information indicating which maximum amount of light is irradiated to which position upon accumulation of the signal is obtained and which function is often required when a two-dimensional sensor is used as a photometric sensor is not provided for the conventional solid state image pickup apparatus.

SUMMARY OF THE INVENTION

It is an object of the invention to solve the above first subject of the invention. To accomplish the above object, according to the invention, there is provided a first solid state image pickup apparatus which is constructed by arranging a plurality of photoelectric converting pixels for accumulating the charges which are produced by receiving a light energy and for amplifying and outputting the charges, wherein the solid state image pickup apparatus comprises: a signal accumulating section in which signal accumulating cells having transistors are arranged; transfer means for transferring signals of the photoelectric converting pixels to control electrodes of the signal accumulating cells as voltages; and reading means for generating the signal from one of the main electrodes of the transistors of the signal accumulating cells.

The transfer means comprises: means for outputting the signal of the photoelectric converting pixel to one of the main electrodes of the transistors as a voltage value at a low impedance; and means for setting the control electrode of the transistor into a floating state of a potential higher than that of the main electrode, wherein the potential of the control electrode is set to a potential that is higher than the potential of the main electrode by only a predetermined voltage by a current flowing in the control electrode, thereby enabling the signal to be transferred to the control electrode of the signal accumulating cell.

It is another object of the present invention to solve the above second subject. To accomplish such an object, according to the invention, there is provided a second solid state image pickup apparatus comprising: pixels each having a transistor which has a control electrode region made by a semiconductor of the first conductivity type and first and second main electrode regions each made by a semiconductor of the second conductivity type different from the frist conductivity type and which can accumulate the charges which are produced by receiving a light energy and an electrode that is capacitively coupled to the control electrode region; and reading means for biasing the potential of the control electrode region in the forward direction for the first main electrode region by controlling the potential of the electrode and for generating the signal corresponding to the accumulated charges from the first main electrode region, wherein the solid state image pickup apparatus comprises potential setting means for setting the potential of the electrode so that the signal corresponding to the accumulated charges is generated from the first main electrode region for a period of time during which the charges are accumulated in the control electrode region and detecting means for detecting the output generated from the first main electrode region for such a period of time.

Further another object of the invention is to solve the above second subject of the invention. To accomplish the above object, according to the invention, there is provided a third solid state image pickup apparatus comprising: pixels each having a transistor which has a control electrode region made by a semiconductor of the first conductivity type and first and second main electrode regions each made by a semiconductor of the second conductivity type different from the first conductivity type and which can accumulate the charges which are produced by receiving a light energy and an electrode that is capacitively coupled to the control electrode region; and reading means for biasing the potential of the control electrode region in the forward direction for the first main electrode region by controlling the potential of the electrode and for generating the signal corresponding to the accumulated charges from the first main electrode region, wherein the solid state image pickup apparatus has detecting means for detecting the potential of the electrode, and the electrode is set into a floating state for a period of time during which the charges are accumulated in the control electrode region, and the electrode potential which fluctuates through a capacitor in association with the accumulation of the charges is detected by the detecting means.

Further another object of the invention is to solve the above second subject of the invention. To accomplish such an object, according to the invention, there is provided a fourth solid state image pickup apparatus in which pixels are arranged in a two-dimensional matrix shape, each of the pixels comprises a transistor which has a control electrode region made by a semiconductor of the first conductivity type and first, second, and third main electrode regions each made by a semiconductor of the second conductivity type different from the first conductivity type and which accumulates the charges produced by receiving a light energy into the control electrode region and which generates a signal corresponding to the accumulated charges from the first and second main electrode regions, each column is provided with a first output line connecting with the first main electrode region of the pixel, each row is provided with a second output line connecting with the second main electrode region of the pixel, first detecting means for detecting an output of the first output line of each column is provided, second detecting means for detecting an output of the second output line of each row is provided, and the outputs of the first and second output lines according to the amount of the accumulated charges are detected by the first and second detecting means during the accumulation of the optical signal.

According to the first solid state image pickup apparatus of the invention, the transistors of the numbers as many as the number of cells of the photoelectric converting section are provided as signal accumulating sections in the other regions different from the photoelectric converting section, and the signals of the cells of the photoelectric converting sections are transferred into the control voltage regions of the cells of the signal accumulating section and can be accumulated and held therein or can be read out therefrom. According to such a construction, the operations such as to transfer the signal into the accumulating capacitor and to read out the signal via the preamplifier can be executed independently of the operation of the photoelectric converting section.

The timings to start and finish the accumulation of the charges of each pixel in the photoelectric converting section can be set to timings which are equal to or are slightly deviated from the accumulating time. Further, it is also possible to provide a function for separating the signal to be obtained from a background output and for taking out such a signal.

According to the second solid state image pickup apparatus of the invention, before the accumulating operation is executed, a potential of the electrode capacitively coupled with the control electrode region is set to a predetermined potential and a potential of the control electrode of the pixel is raised, and in the accumulating mode, one of the main electrodes of the pixel is set into a floating state, and by detecting the current flowing from the main electrode of the pixel to which a strong light was irradiated, the intensity of the maximum irradiation light and its position can be detected during the accumulating operation.

Such a function provides an effect such that the position detection of a target object, automatic exposure, automatic focusing control, and the like can be executed at a high speed when it is applied thereto.

According to the third solid state image pickup apparatus of the invention, the electrode which is capacitively coupled with the control electrode region is set into a floating state and the electrode potential which fluctuates through the capacitor in association with the accumulation of the charges in the control electrode region is detected by the detecting means, thereby enabling an amount of light which is received by the pixel to be detected.

The second solid state image pickup apparatus of the invention detects the light amount from the output side of the pixel. On the other hand, the third solid state image pickup apparatus of the invention detects the light amount from the electrode side (control signal input side) to control the potential of the control electrode of the pixel. Both of the above two inventions are applied to a solid state image pickup apparatus having pixels arranged on a 2-dimensional matrix. The first main electrode regions of the pixels arranged in one direction are commonly connected every column and are connected to the detecting means according to the second solid state image pickup apparatus of the invention, and the electrodes which are capacitively coupled to the pixels arranged in another direction are commonly connected every row and are connected to the detecting means according to the third solid state image pickup apparatus of the invention. With such a construction, among the pixels arranged on the 2-dimensional matrix, the coordinate position of the pixel which has received the maximum amount of light can be known.

According to the fourth solid state image pickup apparatus of the invention, two main electrode region to read out the signal according to the accumulated charges are provided, each column is provided with a first output line connecting with the first main electrode region of the pixel, each row is provided with a second output line connecting with a second main electrode region of the pixel, first detecting means for detecting an output of the first output line of each column is provided, second detecting means for detecting an output of the second output line of each row is provided, and the outputs of the first and second output lines corresponding to an amount of accumulated charges are detected by the first and second detecting means during the accumulation of an optical signal, so that the coordinate position of the pixel which has received the maximum amount of light can be known among the pixels arranged on the 2-dimensional matrix.

The above and other objects and features of the present invention will become apparent from the following detailed description and the appended claims with reference to the accompanying drawings.

DETAILED DESCRIPTION OF THE PREFERRED EMBODIMENTS

Embodiments of the present invention will be described in detail hereinbelow with reference to the drawings.

The first solid state image pickup apparatus of the invention will be first explained.

As a photoelectric converting device which is used in the first solid state image pickup apparatus according to the invention, it is sufficient to use a photoelectric converting device of the amplifying type and it is not particularly limited to a bipolar type sensor.

[Embodiment 1]

Figure 1:
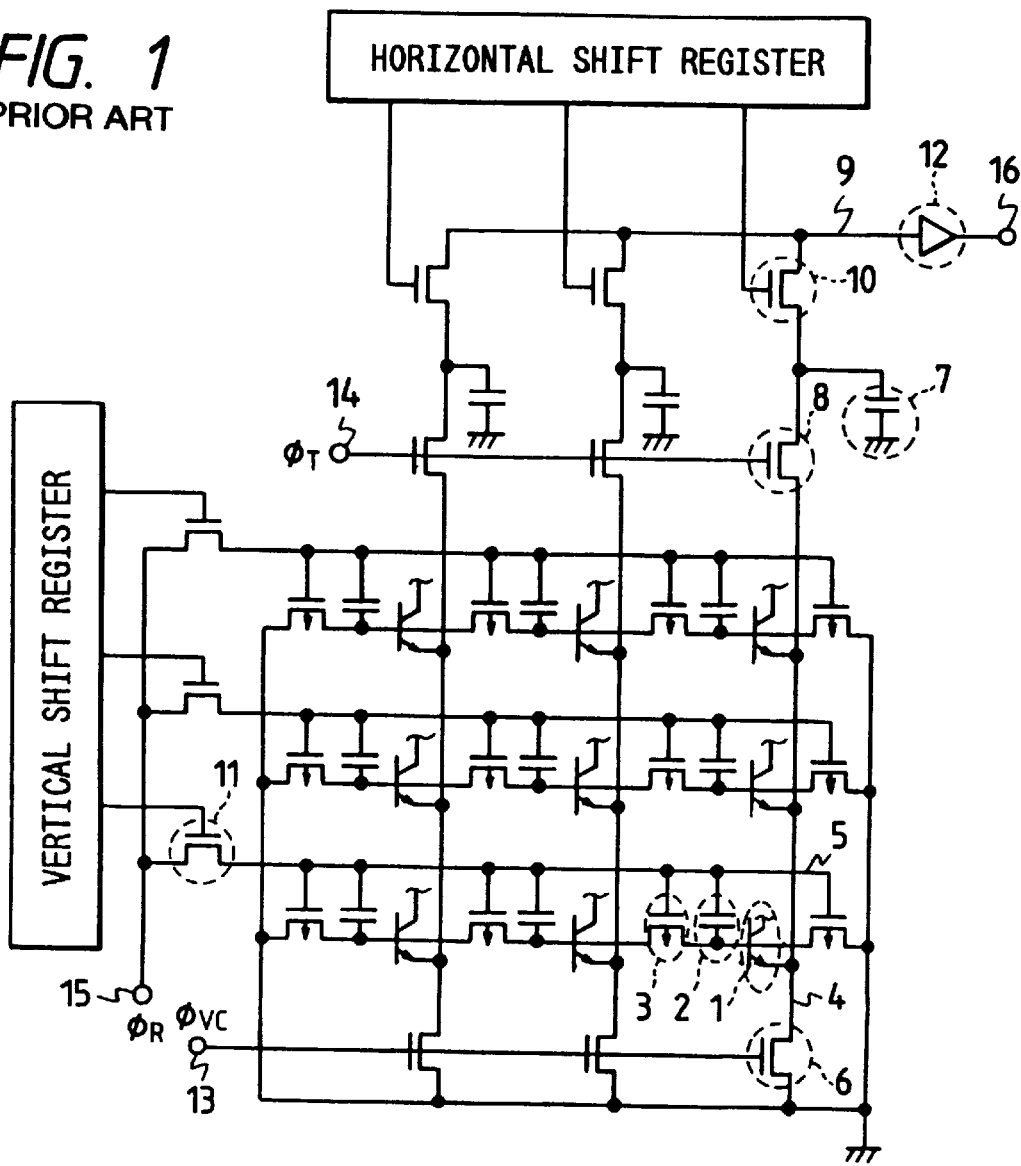
FIG. 1 is a circuit constructional diagram of a photoelectric converting section and a signal reading section of a solid state image pickup apparatus using a bipolar type sensor.
Figure 2:
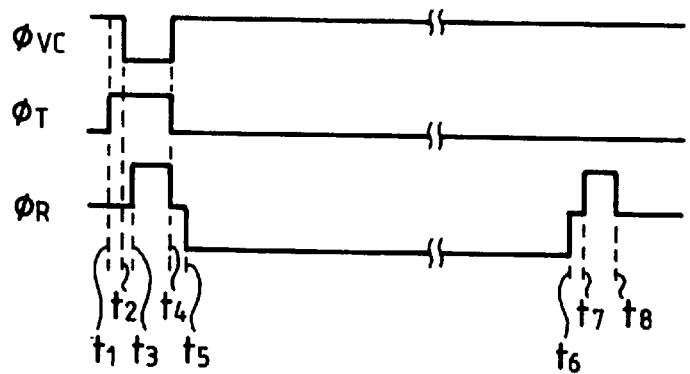
FIG. 2 is a timing chart for explaining the operations of the photoelectric converting section and signal reading section.
Figure 4:
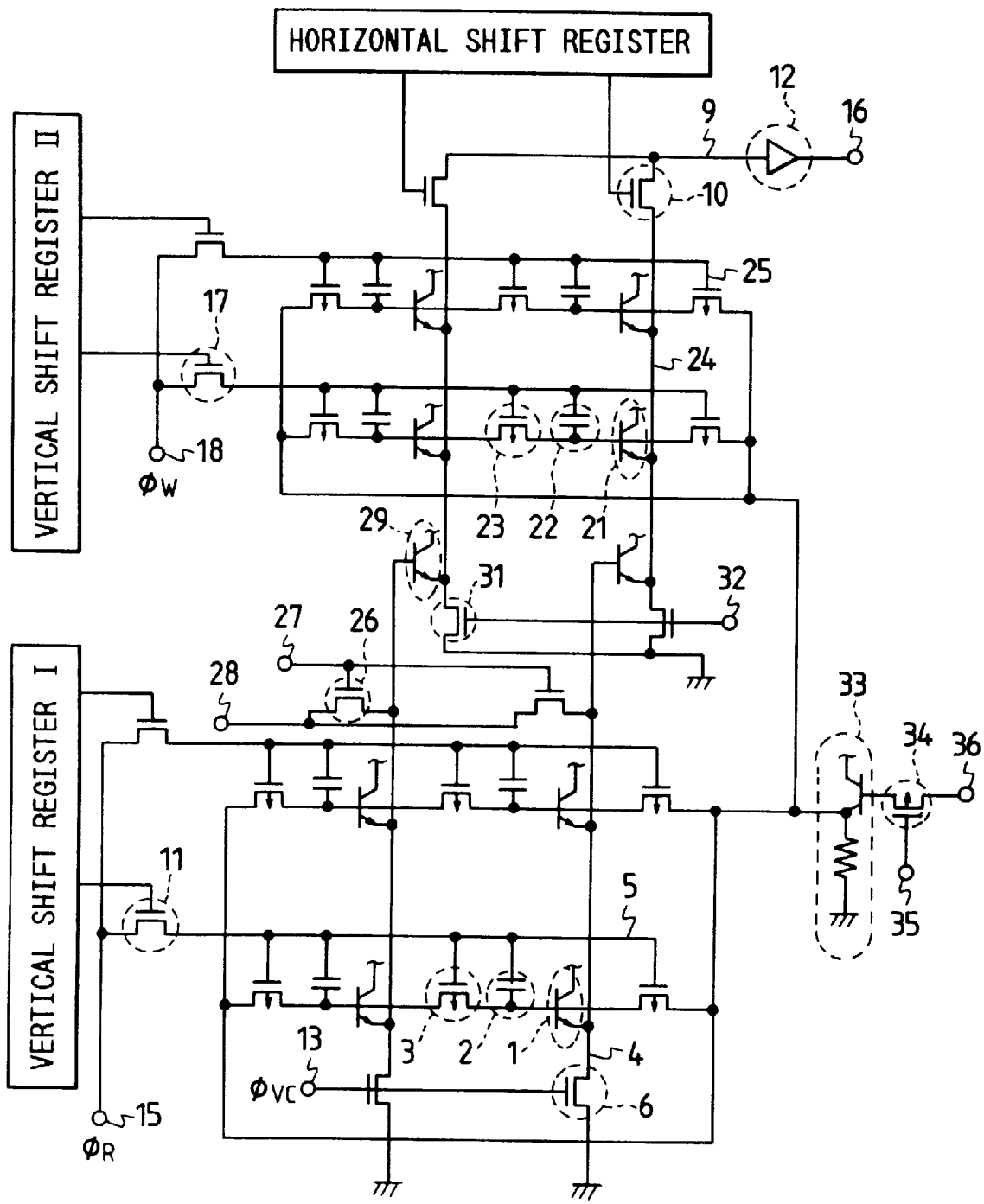
FIG. 4 is a circuit constructional diagram of a photoelectric converting section and a signal reading section according to the first embodiment of a first solid state image pickup apparatus of the invention.

FIG. 4 is a circuit constructional diagram of a photoelectric converting section and a signal reading section of the first solid state image pickup apparatus of the invention. In the embodiment, a construction of only four pixels has been shown for simplicity of explanation. However, the invention is not obviously limited to the number of pixels. In FIG. 4, the same component elements as those shown in the solid state image pickup apparatus of FIG. 1 are designated by the same reference numerals and their detailed descriptions are omitted here.

In the diagram, reference numerals 21, 22, and 23 denote a bipolar transistor, a capacitor, and a PMOS transistor. One cell is formed by the same construction as that of the bipolar type sensor 1, capacitor 2, and PMOS transistor 3. Reference numeral 24 denotes a vertical output line connected to an emitter of the bipolar transistor 21; 25 a horizontal drive line to control a base potential of the bipolar transistor 21 through the capacitor 22; 17 a buffering MOS transistor which is selected by a vertical shift register II and is used to apply a drive pulse to the cell; 18 an input terminal to apply a drive pulse $\phi_W$ to the MOS transistor 17; 26 an MOS transistor to control a potential of the vertical output line 4; 27 an input terminal to apply a pulse to a gate of the MOS transistor 26; 28 a power source terminal to supply a potential at a positive level higher than a grounding potential GND to a source of the MOS transistor 26; 29 a bipolar transistor whose base is connected to the vertical output line 4 and whose emitter is connected to the vertical output line 24; 31 an MOS transistor whose source is connected to the ground GND and whose drain is connected to the vertical output line 24; 32 a terminal to apply a pulse to a gate of the MOS transistor 31; 33 the emitter follower circuit whose emitter output is commonly connected to drains of the PMOS transistors 3 and 23 arranged on the left and right sides in a photoelectric converting cell and an accumulating cell; 34 the PMOS transistor whose source is connected to a base of the emitter follower circuit 33; 35 the terminal to apply a pulse to a gate of the PMOS transistor 34; and 36 a power source terminal to supply a positive potential to a base of the emitter follower circuit 33 through the PMOS transistor 34.

Figure 5:
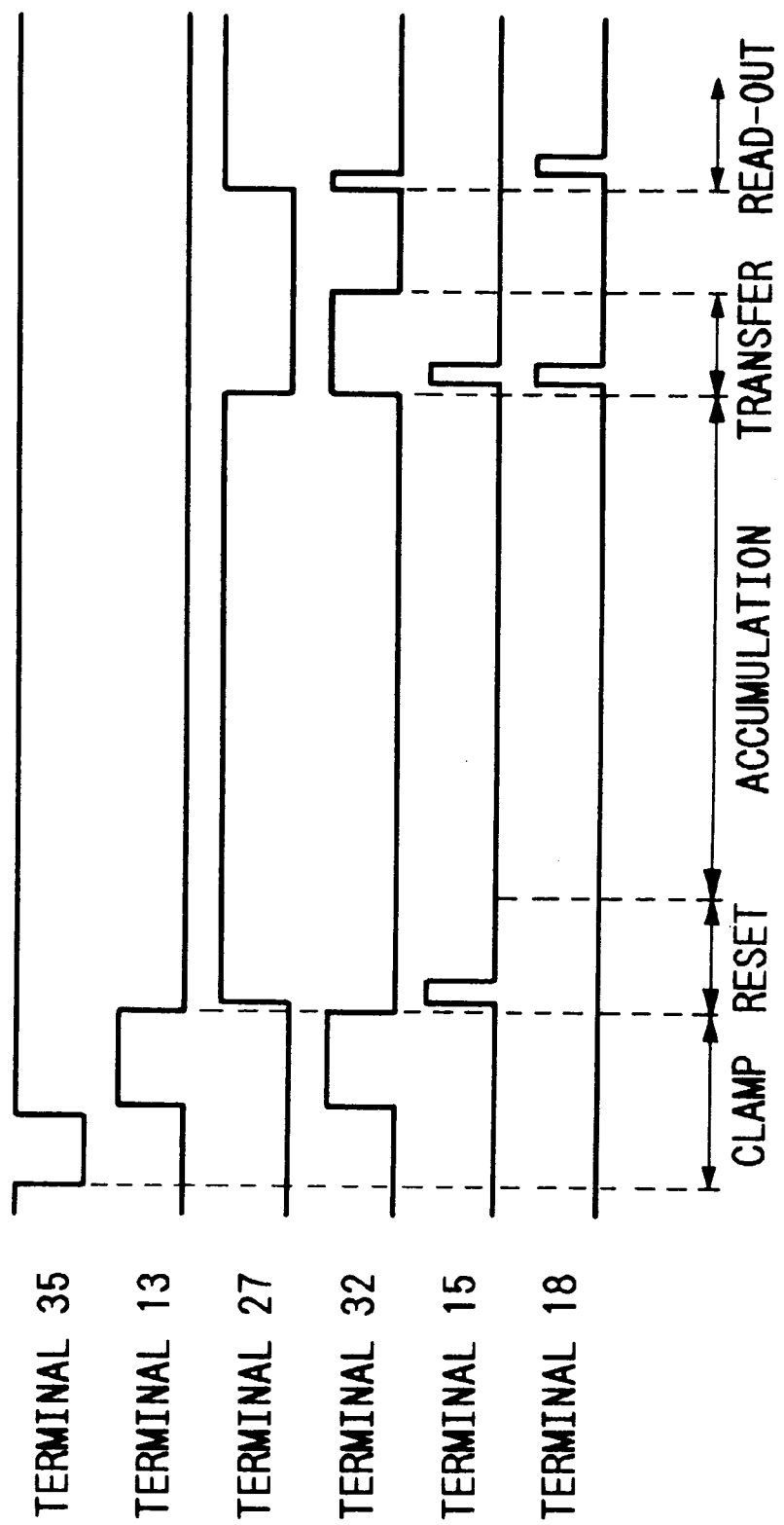
FIG. 5 is a timing chart for pulses which are supplied to pulse terminals in order to execute the operation of the solid state image pickup apparatus shown in FIG. 4.

FIG. 5 shows a timing chart for pulses which are supplied to the pulse terminals in order to execute the operation of the solid state image pickup apparatus shown in FIG. 4. First, the pulse which is applied to the terminal 35 is set to the low level and the potential of the base of the emitter follower circuit 33 is fixed to the positive potential of the power source terminal 36. Thus, a peripheral source section of the PMOS transistor constructing the pixel is set into a positive potential. Thus, all of the PMOS transistors 3 and 23 are made conductive and all of the bases of the bipolar type sensor 1 and bipolar transistor 21 are set to the same positive potential as that of the output of the emitter follower circuit 33. Subsequently, since the pulses which are supplied to the terminals 13 and 32 are set to the high level, the potentials of all of the emitters connected to the vertical output lines 4 and 24 are grounded. The base potentials of the sensor 1 and bipolar transistor 21 is reduced to about $V_{BE}$, namely, about 0.6 V. The processes up to now are called a clamping operation.

Subsequently, the pulse which is supplied to the terminal 27 is set to the high (H) level and the vertical output line 4 is fixed to the power source potential of the power source terminal 28. In this state, the pulse which is supplied to the terminal 15 is set to the H level. When the horizontal drive line 5 selected by a vertical shift register I is set to the H level, the base potential of the sensor 1 of the selected line is raised in the positive direction by the capacitive coupling of the capacitor 2. However, since the emitter potential is fixed to the power source potential of the power source terminal 28, the base potential decreases to a certain predetermined level by the base current flowing in the circuit. When the pulse which is supplied to the terminal 15 is set to the low level, the base potential decreases to a value lower than the emitter potential by the capacitive coupling through the capacitor 2 and the accumulation of the light carriers is started. The processes up to now are called a resetting operation. The resetting operation, however, is sequentially executed for the row selected by the vertical shift register I.

At the time of the completion of the resetting operation, the accumulating operation is started and the signal is accumulated into the base of the bipolar type sensor 1. After that, the transferring operation as a feature of the invention such that the base potential of the sensor 1 is written into the base potential of the bipolar transistor 21 is performed in the following manner. First, the vertical output line 4 is set to the power source potential of the power source terminal 28 through the MOS transistor 26. After that, the vertical output line 4 is set into a floating state. In this state, by setting the pulses which are supplied to the terminals 15, 18, and 32 to the H level, the signal of the sensor cell is read out to the vertical output line 4. Thus, the vertical output line 24 as an output line of the emitter follower circuit comprising the bipolar transistor 29 and MOS transistor 31 is set to the potential corresponding to the output potential of the sensor 1. Since an output impedance of the emitter follower circuit is small, when the pulse which is supplied to the terminal 18 is set to the H level, the base potential of the bipolar transistor 21 is raised. Thus, a base current flows and the resetting operation of the bipolar transistor 21 is executed. However, the base potential upon completion of the resetting operation is set to the level which is obtained by adding a certain predetermined potential (corresponding to the output voltage of the bipolar type sensor) to the potential of the vertical output line 24. Consequently, the signal potential of the photoelectric converting cell of the row selected by the vertical shift register I is transferred as a base potential of the accumulating cell of the row selected by the vertical shift register II. The above transferring operation is sequentially executed with respect to each row. After that, the reading operation from the accumulating cell is performed. The terminal 27 is set to the H level and the base potential of the bipolar transistor 29 is fixed to the power source potential of the power source terminal 28. The pulse is supplied to the terminal 32 and the vertical output line 24 is set to the predetermined potential. After that, the vertical output line 24 is set into a floating state. The terminal 18 is set to the H level. The base potential of the bipolar transistor 21 of the row selected by a vertical shift register II is increased by the capacitive coupling through the capacitor 22. A portion between the emitter and base of the bipolar transistor 21 is forwardly biased. A potential corresponding to the base potential of the bipolar transistor 21 is outputted to the vertical output line 24. The read-out output is outputted from the preamplifier 12 through the horizontal output line 9 by scanning the horizontal shift register and by sequentially turning on the transfer MOS transistors 10.

[Embodiment 2]

Figure 6:
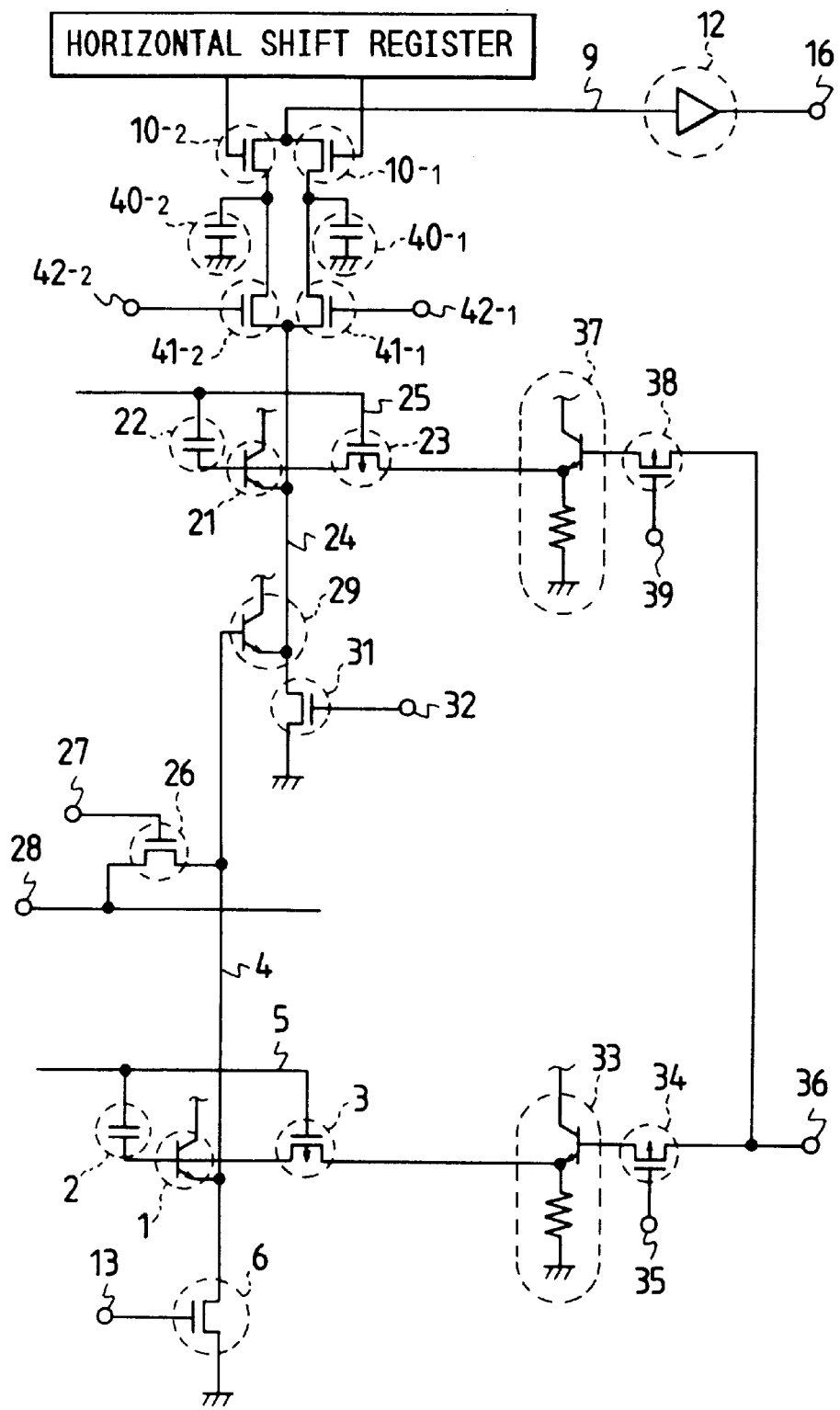
FIG. 6 is a circuit constructional diagram of a photoelectric converting section and a signal reading section of a part of the second embodiment of the first solid state image pickup apparatus of the invention.

FIG. 6 is a circuit constructional diagram of a photoelectric converting section and a signal reading section of a part of a second embodiment of the first solid-state image pickup apparatus of the invention. In FIG. 6, the same component elements as those shown in the solid state image pickup apparatus of FIG. 4 are designated by the same reference numerals and their detailed descriptions are omitted here.

In the diagram, reference numeral 37 denotes an emitter follower circuit to give a source potential of the PMOS transistor 23 in the signal accumulating section; 38 a PMOS transistor connected to a base of the emitter follower circuit 37; 39 a terminal to supply a pulse to a gate of the PMOS transistor 38; 40-1 a capacitor to hold the output of the cell in the signal accumulating section; 40-2 a capacitor to hold an output of the cell in the photosensitive section; 41-1 an MOS transistor to transfer the output of the bipolar transistor 21 from the vertical output line 24 to the capacitor 40-1; 41-2 an MOS transistor to transfer the output of the bipolar type sensor 1 from the vertical output line 24 to the capacitor 40-2; and 10-1 and 10-2 MOS transistors for transferring potentials of the capacitors 40-1 and 40-2 to the horizontal output line 9.

Figure 7:
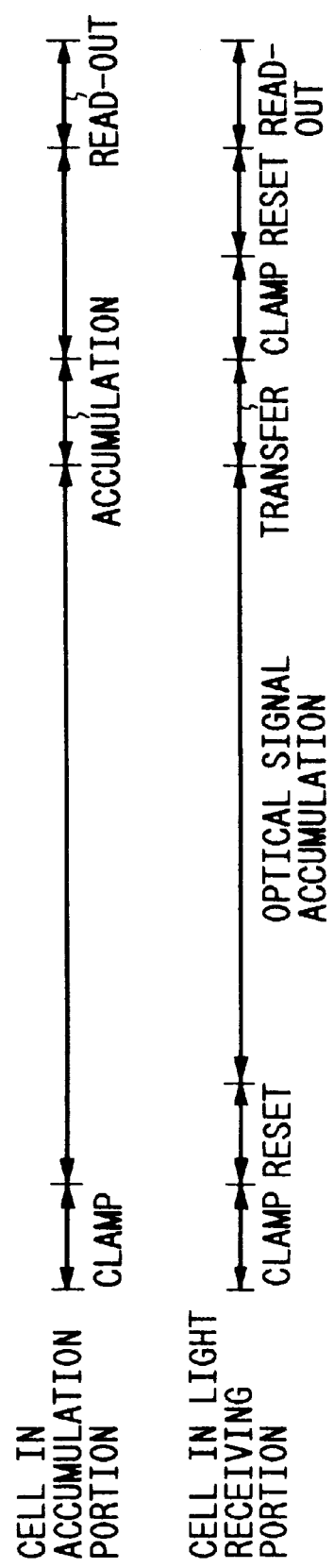
FIG. 7 is a diagram showing the operation order of the solid state image pickup apparatus shown in FIG. 6.

FIG. 7 is a diagram showing the operation order of the solid-state image pickup apparatus shown in FIG. 6.

When comparing FIG. 7 with the first embodiment shown in FIG. 5, the operations up to the clamping operation, resetting operation, accumulating operation, and transferring operation are substantially the same. Since the emitter follower circuit to execute the clamping operation for the light receiving section differs from that for the signal accumulating section, the MOS transistors 34 and 38 are simultaneously turned on in the first clamping operation. After completion of the transferring operation, the clamping and resetting operations are executed for the light receiving section. With respect to the reading operation, when the signal is read out from the cell of the signal accumulating section as shown in FIG. 5 and the output voltage is accumulated in the capacitor 40-1 through the MOS transistor 41-1. Subsequently, the reading operation from the cell in the light receiving section corresponding to the cell in the signal accumulating section from which the signal has been executed is executed in the reset state of the cell in the light receiving section. The output of the bipolar transistor 29 which has received the output potential of the vertical output line 4 is accumulated into the capacitor 40-2 through the MOS transistor 41-2. Subsequently, the potentials of the capacitors 40-1 and 40-2 are outputted through the horizontal output line 9 from the preamplifier 12 by a horizontal shift register. However, since the output of the cell in the light receiving section which was reset is an offset output upon transfer of the signal to the cell in the signal accumulating section, an output that is obtained by subtracting the output of the capacitor 40-2 from the output of the capacitor 40-1 becomes a signal voltage without an offset variation of the bipolar type sensor 1 and bipolar transistor 29 in the light receiving section, namely, a signal voltage of a good S/N ratio.

[Embodiment 3]

Figure 8:
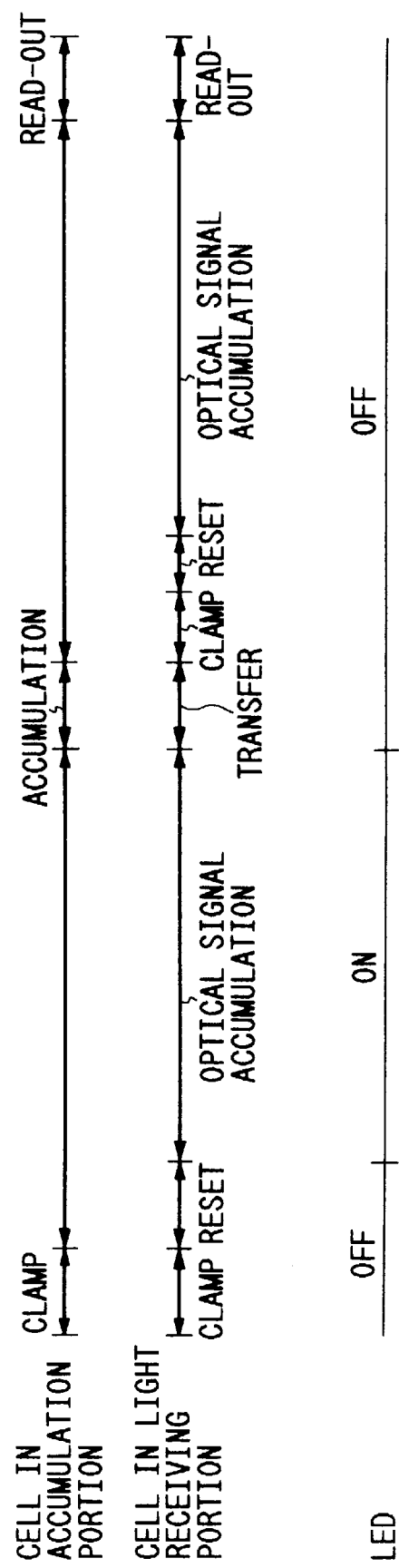
FIG. 8 is a diagram showing the operation order of the third embodiment of the first soild state image pickup apparatus of the invention.

FIG. 8 is an operation timing chart showing the third embodiment of the first solid state image pickup apapratus of the invention. In the third embodiment, the sensor system which is used is substantially the same as that in the second embodiment. In the operation, however, the optical signal accumulating operation of the cell in the light receiving section is executed before the last reading operation. In the first optical signal accumulating operation, the light source such as an LED or the like is turned on. In the later optical signal accumulating operation, however, since the LED is OFF, as a subtraction output that is derived after completion of the reading operation, an output comprising only the reflected light image of the LED in which not only the offset variation of the bipolar type sensor of the light receiving section but also the output of a background object were subtracted is derived.

As for the base of the sensor 1 of the cell as a light receiving section, in order to increase the signal output voltage to the optical signal charges, a higher sensitivity is obtained as a capacity of the capacitor connected to the base is as small as possible. As for the cell in the signal accumulating section, since the signal voltage is transferred, a larger amount of signal charges can be accumulated as the capacitor of the capacity connected to the base is as large as possible. Therefore, the sensor system in which the capacity of the capacitor 22 is set to be larger than that of the capacitor 2 exhibits the performance of a higher S/N ratio. However, when the capacity of the capacitor 22 is increased, the signal transferring speed to the bipolar transistor 21 becomes slow. Therefore, by setting $h_{FE}$ of the bipolar transistor 21 to be higher than $h_{FE}$ of the bipolar type sensor 1, a sensor of a further high S/N ratio and a further high transfer speed is realized in the embodiments 1, 2, and 3 according to the invention.

Second to fourth solid state image pickup apparatuses of the invention will now be described.

Figure 3:
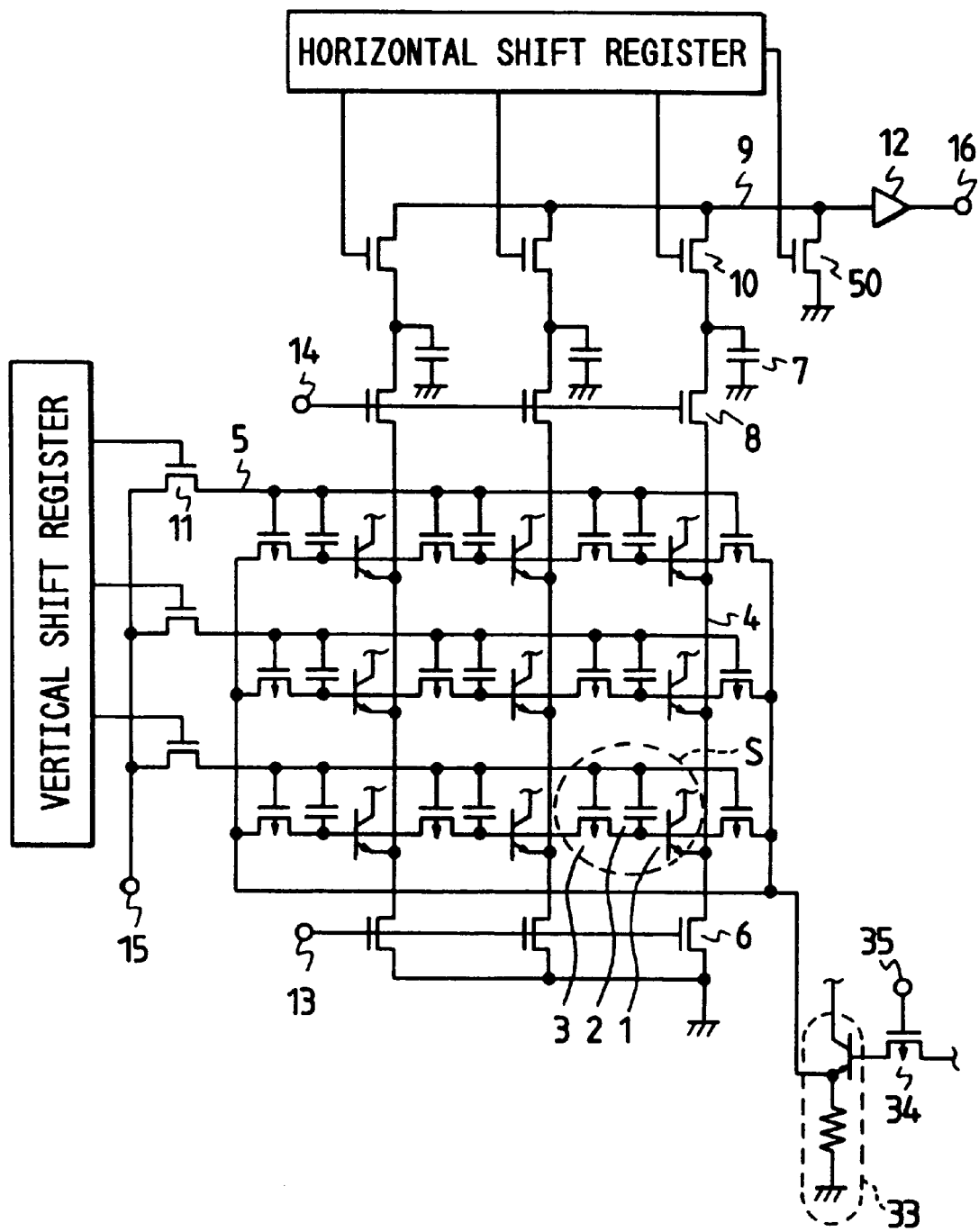
FIG. 3 is a circuit constructional diagram of a photoelectric converting section and a signal reading section of a solid state image pickup apparatus using a bipolar type sensor.
Figure 9:
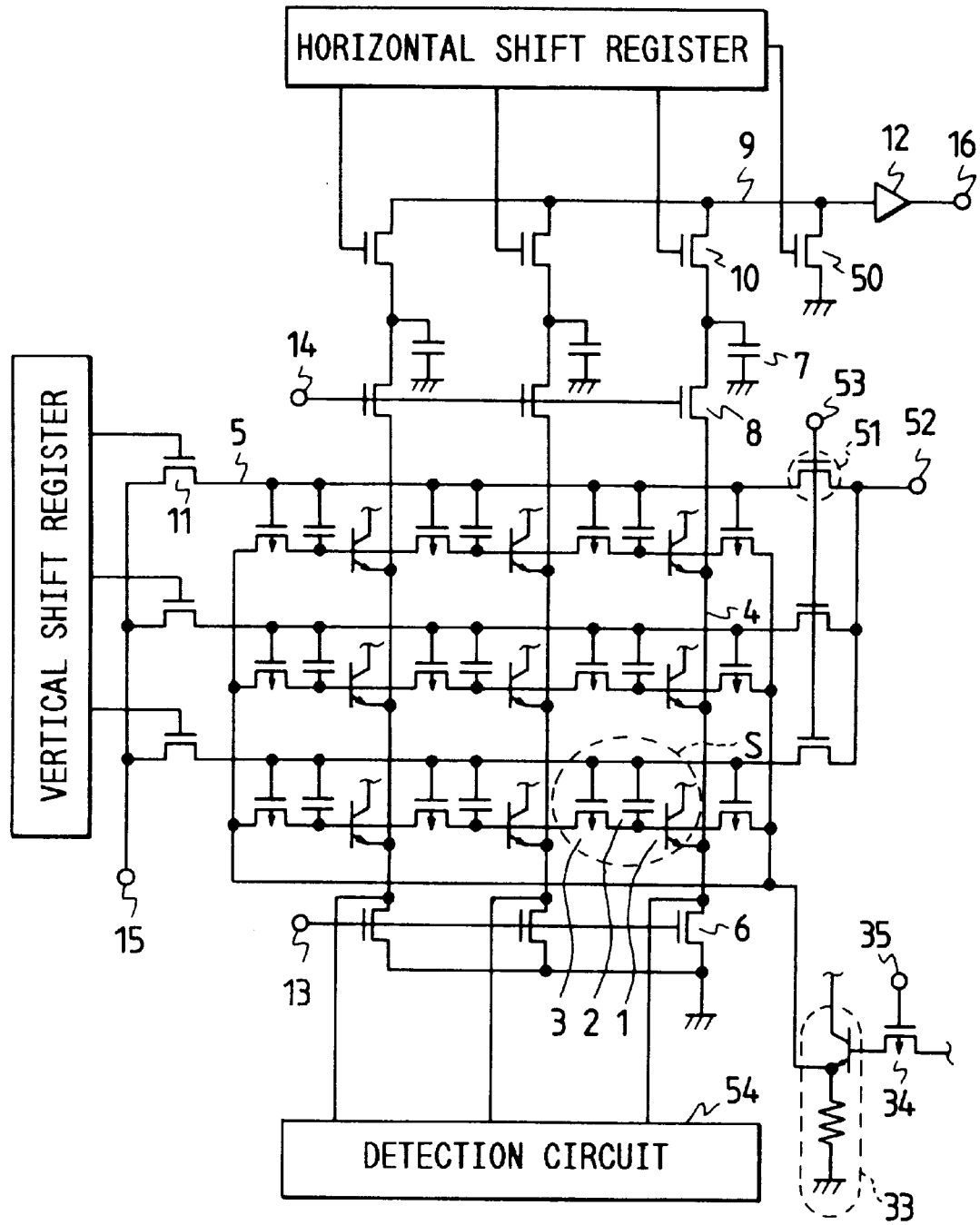
FIG. 9 is a circuit constructional diagram of a photoelectric converting section and a signal reading section of an embodiment of a second solid state image pickup apparatus of the invention.

FIG. 9 is a circuit constructional diagram of a photoelectric converting section and a signal reading section of an embodiment of a second solid state image pickup apparatus of the invention. In the embodiment, a construction of only nine pixels has been shown for simplicity of explanation. However, it will be obviously understood that the invention is not limited to such a number of pixels. In FIG. 9, the same component elements as those shown in the solid state image pickup apparatus shown in FIG. 3 are designated by the same reference numerals and their detailed descriptions are omitted here.

In the diagram, reference numeral 51 denotes a switching MOS transistor connected with the horizontal drive line 5; 52 a power source terminal connected to a source of the MOS transistor 51; 53 a terminal connected to a base of the MOS transistor 51; and 54 a detection circuit to detect an output potential of each vertical output line 4.

The operation of the above solid state image pickup apparatus will now be described.

The MOS transistor 51 is OFF until the end of the second resetting operation. The sensor performs the operations in a manner similar to the conventional operations described by using the solid state image pickup apparatus of FIG. 3. After completion of the second resetting operation, the MOS transistor 6 is turned off and the vertical output line is set into a floating state. Subsequently, the MOS transistor 51 is turned on and the potential of the horizontal drive line 5 is set to a potential of the power source terminal 52. The potential of the power source terminal 52 is set to a value higher than the low level of the pulse which is supplied from the terminal 15 in order to drive the pixel. A base potential of the pixel S is increased from the potential at the time of the end of the second resetting operation. Although it is also possible to set the potential of the power source terminal 52 to a high enough level and to forwardly bias the circuit between the base and emitter of the pixel S, the potential of the power source terminal 52 is set to a value suitable for the necessary detection level.

In this state, the operation to accumulate the light charges is started. The output potential of the vertical output line 4 is determined by an emitter current flowing from the pixel whose base potential has increased because the strongest light has been irradiated among the pixels connected to the vertical output line 4. Due to this, in which column the pixel irradiated by the strongest light exists among all of the pixels can be known during the accumulation of the optical signal from the detection circuit 54 to detect the potential of the vertical output line 4.

Figure 10:
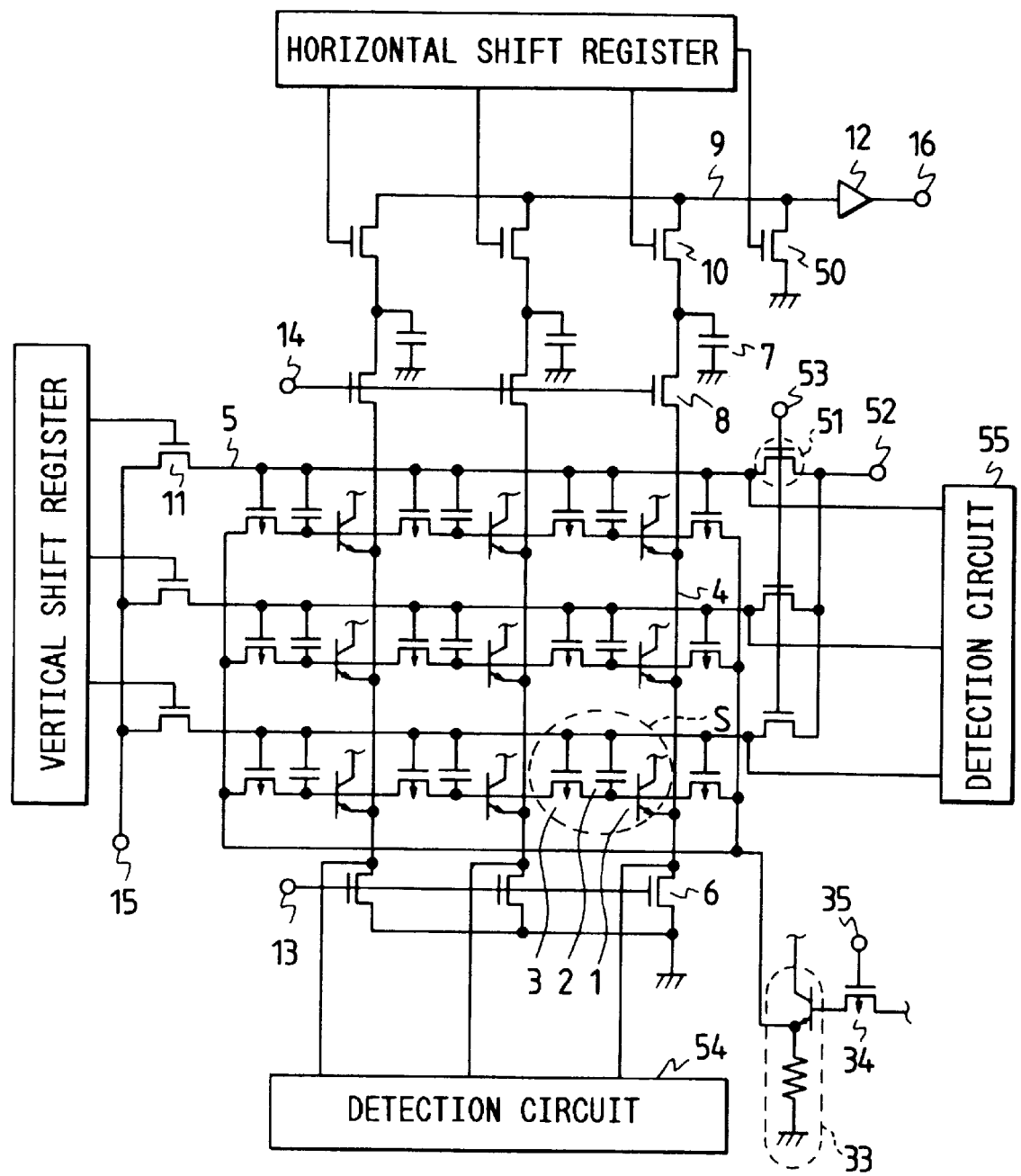
FIG. 10 is a circuit constructional diagram of a photoelectric converting section and a signal reading section of an embodiment of a third solid state image pickup apparatus of the invention.

FIG. 10 is a circuit constructional diagram of a photoelectric converting section and a signal reading section of an embodiment of a third solid state image pickup apparatus of the invention. In FIG. 10, the same component elements as those in the solid state image pickup apparatus of FIG. 9 are designated by the same reference numerals and their detailed descriptions are omitted here. In the diagram, reference numeral 55 denotes a circuit to detect the potential of the horizontal drive line 5.

In the solid state image pickup apparatus of FIG. 10, the processes up to a process to raise the potential of the horizontal drive line 5 to the potential of the power source terminal 52 after completion of the second resetting operation are substantially the same as those in the solid state image pickup apparatus of FIG. 9. After that, the MOS transistor 51 is turned off and the optical signal is accumulated in a floating state of the horizontal drive line 5. When the base potential of the pixel irradiated by the light rises, the potential of the horizontal drive line 5 also rises through the capacitive coupling of the capacitor 2. The increased amount of the potential of the horizontal drive line 5 is proportional to the sum of the light amount which is irradiated to the pixels existing on one horizontal row of the horizontal drive line 5. According to the embodiment, therefore, in addition to that the column at which the pixel which has received the maximum amount of light is located can be known from the detection circuit 54 in a manner similar to the solid state image pickup apparatus of FIG. 9, with respect to the sum of the amounts of lights irradiated to the pixels of each horizontal row, which horizontal row has the largest total light amount can be known from the detection circuit 55. Particularly, in the case where a state such that a spot light exists in a dark background is detected by the sensor, it is possible to determine that the pixel irradiated by the maximum amount of light is located on the horizontal row of the horizontal drive line 5 indicative of the maximum output potential. In addition to the infromation from the detection circuit 54, the coordinate position of the pixel irradiated by the maximum amount of light can be known in the 2-dimensional sensor.

Figure 11:
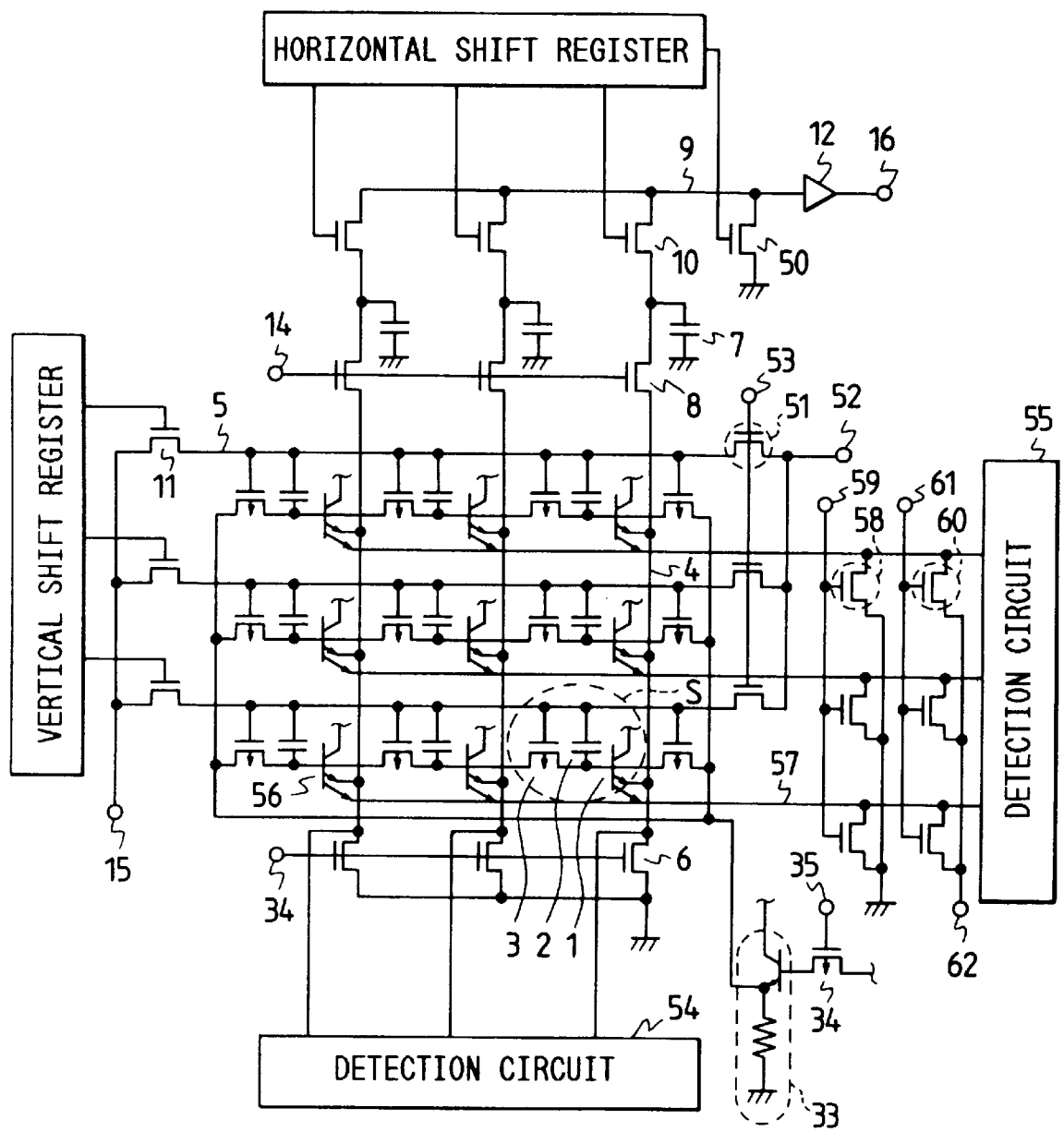
FIG. 11 is a circuit constructional diagram of a photoelectric converting section and a signal reading section of an embodiment of a fourth solid state image pickup apparatus of the invention.

FIG. 11 is a circuit constructional diagram of a photoelectric converting section and a signal reading section of an embodiment of a fourth solid state image pickup apparatus of the invention. In FIG. 11, the same component elements as those shown in the solid state image pickup apparatus of FIG. 10 are designated by the same reference numerals and their detailed description are omitted here.

In FIG. 11, reference numeral 56 denotes an emitter provided in addition to the emitter of the conventional pixel and 57 denotes a horizontal line connected to the emitter 56 of the pixel of the horizontal row. A potential of the horizontal line 57 is detected by a detection circuit 55. Reference numeral 58 denotes an MOS transistor to connect a potential of the horizontal line 57 to the ground; 59 a pulse terminal connected to a gate of the MOS transistor 58; 60 an MOS transistor to set the potential of the horizontal line 57 to a positive potential; 61 a pulse terminal connected to a gate of the MOS transistor 60; and 62 a power source terminal connected to a source of the MOS transistor 60.

In the first and second resetting operations of the pixel and in the reading operation of the pixel signal to the capacitor 7, the MOS transistor 58 is turned off and the MOS transistor 60 is turned on, thereby setting the horizontal line 57 to a potential of the power source terminal 62. The potential of the power source terminal 62 is set to a positive potential such as to keep a reverse bias between the base and emitter 56 of the pixel during the resetting operation and reading operation of the pixel.

After completion of the second resetting operation, the MOS transistor 60 is turned off and the MOS transistor 58 is turned on, thereby once connecting the horizontal line 57 to the ground. After that, the MOS transistor 58 is turned off and the horizontal line 57 is set into a floating state. In this instance, the vertical output line 4 is also set into a floating state. After that, the MOS transistor 51 is turned on and the horizontal drive line 5 is set into a positive potential by the terminal 52 and the accumulating operation is started in this state. In a manner similar to the case described in the solid state image pickup apparatus of FIG. 10, on which column the pixel irradiated by the strongest light in the 2-dimensional sensor exists can be known by the detection circuit 54. On which row such a pixel exists can be known by the detection circuit 55.

Figure 12:
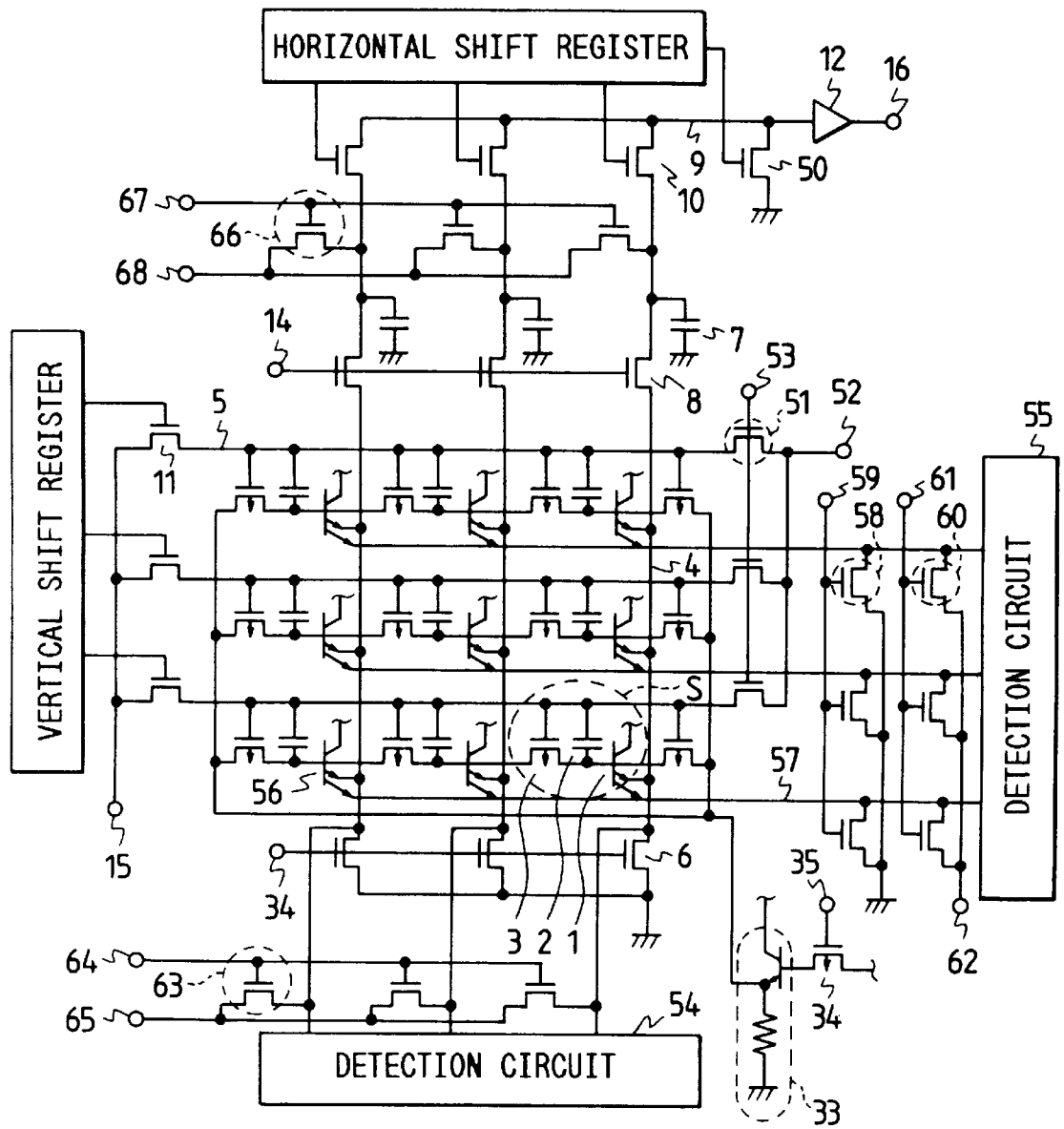
FIG. 12 is a circuit constructional diagram of a photoelectric converting section and a signal reading section of another embodiment of the fourth solid state image pickup apparatus of the invention.

FIG. 12 is a circuit constructional diagram of a photoelectric converting section and a signal reading section of another embodiment of the fourth solid state image pickup apparatus of the invention. In FIG. 12, the same component elements as those shown in the solid state image pickup apparatus of FIG. 11 are designated by the same reference numerals and their detailed descriptions are omitted here.

In the diagram, reference numeral 63 denotes an MOS transistor to control the potential of the vertical output line 4; 64 a terminal to supply a pulse to a gate of the MOS transistor 63; 65 a power source terminal connected to a source of the MOS transistor 63; 66 an MOS transistor to set the potential of the capacitor 7; 67 a terminal to supply a pulse to a gate of the MOS transistor 66; and 68 a power source terminal connected to a source of the MOS transistor 66.

With a construction of the pixel as shown in the embodiment of FIG. 11, two horizontal lines and one vertical line are connected per unit pixel. It is desirable that all of those three lines are made by metal wirings of aluminum or the like in order to reduce time constants of those wirings. When such metal wirings are used, however, there occur drawbacks such that degrees of concave and convex portions of the surface of the pixels increase due to an influence by contact portions of the metal wirings or the like and that an aperture ratio decreases because aperture portions are shut off by the wirings. To avoid such drawbacks, it is sufficient to form the horizontal drive line by polysilicon or the like and to wire the horizontal line 57 by metal such as aluminum or the like onto the horizontal drive line 5 through an insulating layer between layers. When such a construction is used, however, since a wiring resistance of polysilicon increases, there occurs a problem such that a timing to receive the drive pulse from the horizontal drive line 5 in the pixel at the right edge of the 2-dimensional sensor is deviated from the timing for the pixel at the left edge because of the time constants. The embodiment intends to provide means for solving such a problem. The operation of the embodiment in this case will now be described hereinbelow.

The embodiment differs from the embodiment of FIG. 11 with respect to the second resetting operation and reading operation. First, in the second resetting operation, the capacitor 7 is set into a floating state after it was set into a positive potential of the power source terminal 65 by the vertical output line 4 and MOS transistor 63. The horizontal line 57 is fixed to a positive potential by the MOS transistor 60 and power source terminal 62.

In this state, the potential of the horizontal drive line 5 is set to the H level. In this instance, the circuit between the base and emitter is reversely biased and no base current flows. After the elapse of a time during which a delay of the time constant is enough small, the MOS transistor 6 is turned on and the second resetting operation is executed. After the MOS transistor 6 was turned off, the MOS transistor 63 is turned on and the vertical output line 4 is set to a positive potential. After that, the potential of the horizontal drive line 5 is returend to the low (L) level.

In the reading operation, when the horizontal drive line 5 is set to the L level, the MOS transistor 63 is temporarily turned on and the vertical output line 4 is set into a floating state. The horizontal line 57 is fixed to the positive potential by the MOS transistor 60. The capacitor 7 is set into a floating state of a negative potential by the MOS transistor 66 and the power source terminal 68 having a negative potential level. In this state, the horizontal drive line 5 is set to the H level. After the elapse of a time such that an influence by the time constant disappears, a pulse of the high level is supplied to the terminal 14 and the MOS transistor 8 is turned on. In this instance, the potential of the vertical output line 4 is decreased because the capacitor 7 is set to a negative potential. An emitter current flows from the pixel of the reading row. The signal output from the pixel is accumulated in the capacitor 7. When the MOS transistor 8 is turned off, the reading operation is finished.

By executing the operations as described above, the position of the peak output pixel in the accumulating operation as described in the embodiment of FIG. 11 can be known with a pixel structure such that an aperture ratio or the like is not so decreased as compared with that in the conventional pixel.

What is claimed is:

1. A solid state image pickup apparatus comprising:
    a conversion block including a plurality of photoelectric converting elements, arranged in rows and columns, each for accumulating charges which are produced by a light energy and for amplifying and outputting the charges;
    a signal storing block provided separately from said conversion block and including signal storing cells arranged in rows and columns corresponding to said plurality of photoelectric converting elements respectively, wherein each storing cell includes a transistor for storing a signal and for amplifying said signal;
    a buffer for outputting the signal outputted from said conversion block to said signal storing block, wherein an output impedance of said buffer is lower than an output impedance of said conversion block;
    transfer means for transferring the signal of the photoelectric converting element to the corresponding signal storing cell through said buffer;
    reading means for outputting the signal from the signal storing cell; and
    control means for controlling said conversion block and said signal storing block independently of each other.

2. An apparatus according to claim 1, wherein each signal storing cell includes a bipolar transistor.

3. An apparatus according to claim 2, wherein said transfer means has:
    means for outputting the charges of said photoelectric converting element as a voltage value to an emitter of said bipolar transistor by a low impedance; and
    means for setting a base of the bipolar transistor into a floating state of a potential higher than that of the emitter,
    and the base potential is set to the potential higher than the emitter potential by only a predetermined voltage by a base current flowing, thereby transferring the signal to the base of the bipolar transistor.

4. An image pickup apparatus comprising:
    (a) a conversion area including a plurality of photoelectric converting elements;
    (b) a storing area including a plurality of storing elements for storing outputs of said photoelectric converting elements, wherein each of said storing elements stores a corresponding output of a respective one of said photoelectric converting elements;
    (c) a buffer for outputting the signal outputted from said conversion area to said storing area, wherein an output impedance of said buffer is lower than an output impedance of said conversion area;
    (d) transfer means for transferring the signal of the photoelectric converting element to the corresponding signal storing element through said buffer;
    (e) reading means for sequentially reading out signals stored in said storing elements; and
    (f) control means for controlling said conversion area and said storing area independently of each other.

5. An image pickup apparatus according to claim 4, wherein each of said photoelectric converting elements includes an amplifier for amplifying a photoconversion signal.

6. An image pickup apparatus according to claim 5, wherein said amplifier included in each said photoelectric converting element comprises a transistor.

7. An image pickup apparatus according to claim 4, wherein each of said storing elements includes an amplifier for amplifying a stored signal.

8. An image pickup apparatus according to claim 7, wherein said amplifier included in each said storing element comprises a transistor.

9. An image pickup apparatus according to claim 8, wherein said transistor included in each photoelectric converting element is a same type as said transistor included in each said storing element.

10. An image pickup apparatus comprising:
(a) a conversion area including a plurality of photoelectric converting elements each having an amplifier for amplifying a photoelectric converting signal;
(b) a storing area including a plurality of storing elements arranged for storing outputs of said photoelectric converting elements, each storing element having an amplifier for amplifying a corresponding output of a respective one of said photoelectric converting elements;
(c) a buffer for outputting the signal outputted from said conversion area to said storing area, wherein an output impedance of said buffer is lower than an output impedance of said conversion area;
(d) transfer means for transferring the signal of the photoelectric converting element to the corresponding signal storing element through said buffer;
(e) reading means for sequentially reading out signals stored in said storing elements; and
(f) control means for controlling said conversion area and said storing area independently of each other.

11. An image pickup apparatus according to claim 10, wherein said amplifier included in each said photoelectric converting element comprises a transistor.

12. An image pickup apparatus according to claim 11, wherein said amplifier included in each storing element comprises a transistor.

13. An image pickup apparatus according to claim 12, wherein said transistor in each said photoelectric converting element is a same type as said transistor included in each said storing element.

14. A solid-state image pickup apparatus comprising:
a conversion area including a plurality of photoelectric converting elements, each for accumulating charges which are produced by a light energy;
a storing area including a plurality of storing elements for storing signals from said conversion area, wherein each of said storing elements stores a corresponding output of a respective one of said photoelectric converting elements;
a buffer for outputting the signal outputted from said conversion area to said signal storing area, wherein an output impedance of said buffer is lower than an output impedance of said conversion area; and
reading means for reading out signals stored in said storing elements.

15. A solid-state image pickup apparatus comprising:
a conversion area including a plurality of photoelectric converting elements, wherein each photoelectric converting element includes a transistor for amplifying and outputting a photoelectric converting signal to an output line;
a storing area including a plurality of storing elements corresponding to said plurality of photoelectric converting elements respectively, for storing signals from said conversion area, wherein each storing element includes a transistor for amplifying and outputting a stored signal to said output line;
an input controller, arranged to input said photoelectric converting signal on said output line to said storing element; and
an output controller, arranged to output said signal stored in said storing elements to said output line, wherein output control by said output control means is different from input control by said input control means.

* * * * *

UNITED STATES PATENT AND TRADEMARK OFFICE
CERTIFICATE OF CORRECTION

PATENT NO. : 6,049,357
DATED : April 11, 2000
INVENTOR(S) : MAHITO SHINOHARA

It is certified that error appears in the above-identified patent and that said Letters Patent is hereby corrected as shown below:

ON THE TITLE PAGE:

[56] References Cited under FOREIGN PATENT DOCUMENTS

Insert: --0473294 3/1992 Europe--.

COLUMN 1:
Line 15, "charges and generating." should read
--charges.--;

Line 21, "charges and" should read --charges.--; and
Line 22, "generating." should be deleted.

COLUMN 4:
Line 31, "frist" should read --first--.

COLUMN 6:
Line 27, "region" should read --regions--.

COLUMN 12:
Line 10, "infromation" should read --information--.

UNITED STATES PATENT AND TRADEMARK OFFICE
CERTIFICATE OF CORRECTION

PATENT NO. : 6,049,357
DATED : April 11, 2000
INVENTOR(S) : Mahito Sinohara

It is certified that error appears in the above-identified patent and that said Letters Patent is hereby corrected as shown below:

COLUMN 13:
Line 42, "enough small," should read --small enough,--.

Signed and Sealed this

Twelfth Day of June, 2001

Attest:

Attesting Officer

NICHOLAS P. GODICI

*Acting Director of the United States Patent and Trademark Office*